United States Patent [19]

Dahl

[11] 3,711,693

[45] Jan. 16, 1973

[54] MODULAR BCD AND BINARY ARITHMETIC AND LOGICAL SYSTEM

[75] Inventor: James N. Dahl, Phoenix, Ariz.

[73] Assignee: Honeywell Information Systems Inc., Waltham, Mass.

[22] Filed: June 30, 1971

[21] Appl. No.: 158,461

[52] U.S. Cl. ....................235/174, 235/175

[51] Int. Cl. ....................G06f 7/50

[58] Field of Search ....................235/174, 175

[56] References Cited

UNITED STATES PATENTS

| | | | |
|---|---|---|---|
| 3,265,876 | 8/1966 | Lethin | 235/175 X |
| 3,400,259 | 9/1968 | Maczko et al. | 235/175 X |
| 3,596,074 | 7/1971 | Mitrofanoff | 235/174 |

*Primary Examiner*—Malcolm A. Morrison
*Assistant Examiner*—David H. Malzahn
*Attorney*—Fred Jacob et al.

[57] ABSTRACT

An arithmetic and logical unit for receiving four bit portions (quartets) of two input operands, a carry-in and several function control signals generates selectively several functions of the operands, including decimal and binary addition and subtraction functions or a desired logical function and provides carry look-ahead and carry signals. A set of conversion gates selectively provides either a true or an excess-6 form of the first operand quartet while a complementation set of gates selectively provides a true or 1's complement form of the second operand quartet. Bit pairs, from the corresponding positions in the resulting quartets, are combined to produce elementary logical functions, including the AND, inclusive OR and exclusive OR functions. In parallel, these elementary functions, an input carry bit, a set of carry look-ahead gates, a set of adder gates and a pair of control signals respectively provide carry signals and the selected function of the operands. A set of decimal correction gates, responsive to the carry signals, are used to correct the adder gate output for decimal addition and subtraction, when necessary.

5 Claims, 4 Drawing Figures

MODULAR BCD AND BINARY ARITHMETIC AND LOGICAL SYSTEM

BACKGROUND OF THE INVENTION

Electronic computers have generally been binary oriented for many reasons. These reasons include the fact that substantially all of the best basic high-speed storage elements are two-state devices, hence inherently binary. Also, for processing numerical data, particularly of a scientific nature, a binary representation tends to provide greater speed, accuracy and economy. However, it is desirable to have the capability of processing decimal numerical data directly for many applications. An example of where this capability is important is where there is a very large quantity of input and output data in decimal representations and only one or two simple arithmetic operations are required for each piece of data. With a binary computer, more processing time may be required for code conversion than useful data processing. More important is that higher level programming languages such as COBOL are widely used and the standards specifying their characteristics make it practically a necessity of maintain the processed data in a decimal representation. This means that a pure binary computer must emulate a decimal processor, which requires substantial sacrifices in efficiency.

Accordingly, it is advantageous to have both binary and decimal processing capability available directly. One approach is to have both decimal and binary arithmetic units. In addition to the costs of effectively duplicating units, there are extensive costs involved in implementing the associated cables, switches and control circuits.

In general, decimal numbers are represented in binary registers, etc., by the natural 8–4–2–1 code, which corresponds to the standard binary polynomial representation, $2^3$, $2^2$ , $2^1$ , $2^0$ , except that values for 10–15 are disallowed. Where alphanumeric data is involved, the digit code is extended with leading zone bits, "1111" in EBCDIC, "0101" in ASCII, as examples, but the basic polynomial representation is retained. However, other coding can be used. For example, if digits are represented by an excess-3 code, where each digit has an encoded binary value three greater than its true value, a binary adder can be used to directly add two decimal operands. However, the result is not in excess-3 form so that further code conversions are required for further arithmetic processing. Furthermore, this approach requires accommodation of a second code representation which differs from the native binary representation of the system.

Another area which presents problems for integrating decimal and binary functions is the way in which number signs are represented. The most common sign representation for binary numbers is the 2's complement form whereas decimal representations are sign and magnitude. This results in many implementation conflicts, some direct and some subtle. With 2's complement representation, arithmetic operations can be performed essentially ignoring the signs of the operands. With a sign and magnitude representation, the sign controls the machine functions. For example, if a computer addition operation is specified for operands having different signs, normally a subtract function must be performed on the magnitude of the operands, with a positive sign assumed for the result. The result of the subtraction must then be tested for a negative valve, and if negative, the magnitude portion of the result must be negated and the sign changed to minus.

Because of considerations such as these, it is apparent that major problems exist in combining decimal and binary arithmetic capabilities. Although multifunction modules, having multiple bit input operands, have been provided in the past, such modules have not incorporated decimal function capabilities effectively integrated with binary arithmetic and/or logical functions. It is accordingly a primary object of the invention to provide an arithmetic and logical unit module which performs both decimal and binary addition and subtraction, while sharing a common set of add gates, with a minimum of sacrifice of binary arithmetic efficiency.

It is a further object of the invention to provide an arithmetic unit which processes decimal data with much of the efficiency obtainable with binary 2's complement representation.

It is a still further object of the invention to provide an arithmetic unit building block, suitable for implementation as a single integrated circuit, or a portion thereof, which performs binary or decimal addition or subtraction, or a desired logical function.

It is another object of the invention to provide an arithmetic unit building block which supports systems processing signals in either true or bit complemented form.

SUMMARY OF THE INVENTION

A function generator building block module is provided which receives as inputs a pair of bit quartets from a pair of operands, a carry-in signal, and a set of function selection signals. The output of the building block for arithmetic functions is a quartet of sum bits that is either the sum or the difference of the input quartets, which are treated selectively as binary numbers or binary-coded decimal digits, a carry-out signal, and carry look-ahead signals, which enable speed-up addition for several parallel function generator building blocks. The output of the building block for logical functions is selectively the inclusive OR, exclusive OR and AND functions on bit pairs, where each bit from an input quartet is compared with the corresponding bit in the other bit quartet. In addition to these logical functions, the complements of these functions are also selectable. These capabilities have significance beyond themselves in that they simplify the data processor control unit functional requirements and support data processor systems which match better the processing requirements of the real world.

The common core of the module consists of a set of elementary logical function gates which generate for each bit pair a complete set of logic terms, i.e., from which any desired function of the input quartets and a function select signal can be generated with a two-level sum of products or equivalent logic, and a set of adder gates which generates either the binary sum of bit quartets, including a carry-in, or a selected set of logical functions of bit pairs. In addition to this core, sets of gates are provided to complement selectively one input quartet, supporting subtraction and the complemented logical functions, and to convert selectively the other input quartet to an excess-6 code for decimal addition.

A set of carry look-ahead gates, which are connected to the first level of the elementary function gate set, provide carry-out signals and generate and propagate signals for carry look-ahead logic and provides a correction control signal for decimal arithmetic functions. Accordingly, the module carry function outputs are generated in parallel with the bit function outputs and are independent of a carry-in input from an adjoining less significant module. A two-level set of logic gates is connected to the output of the adder gate set to correct the function generator output quartet for decimal arithmetic, under the control of the carry look-ahead gate set.

The resulting building block module provides enhanced function generation capability for a data processing system while reducing the control logic required for the system. In implementing a system, it is generally only necessary to provide a set of function selection signals. The building block includes built-in logic for controlling the adder so as to provide the desired arithmetic or logical function without further logical control from the system, thereby minimizing the logic and timing requirements for the system.

However, a residue of auxiliary system functions are required, such as supplying a carry-in to the least significant bit for subtraction operations. For decimal arithmetic operations, it is necessary for the system to test the operand signs so that the addition of operands with unlike signs is transformed into a subtraction operation and vice versa for subtraction. When the function generators generate the difference between operands and the subtrahend is greater in magnitude than the minuend, the result is in a negative 10's complement form. The function generators provide the system with a carry-out signal from the most significant bit position enabling the system to change the result or to store an indication of the condition.

DESCRIPTION OF THE PREFERRED EMBODIMENT

Figure 1:
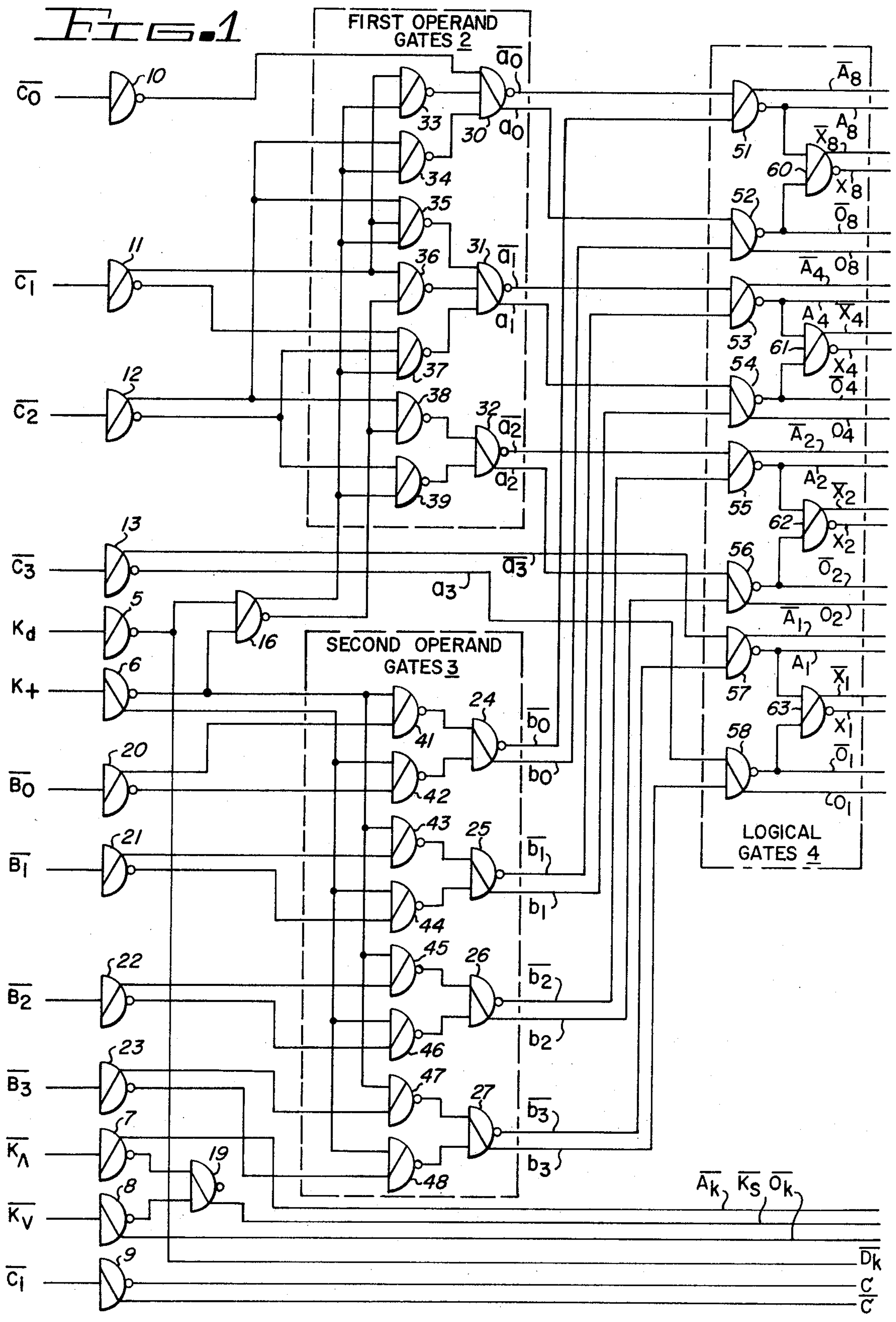
FIG. 1, FIG. 2*a* and FIG. 2*b* together form a logic diagram of an arithmetic and logic unit building block module which embodies the present invention.
Figure 3:
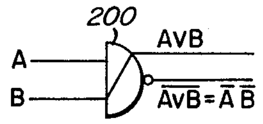
FIG. 3 is a diagram of a NOR gate, the primary logical element of FIGS. 1, 2*a* and 2*b*, which illustrates the logical relationships between the inputs and outputs for the NOR gates.
Figure 2A:
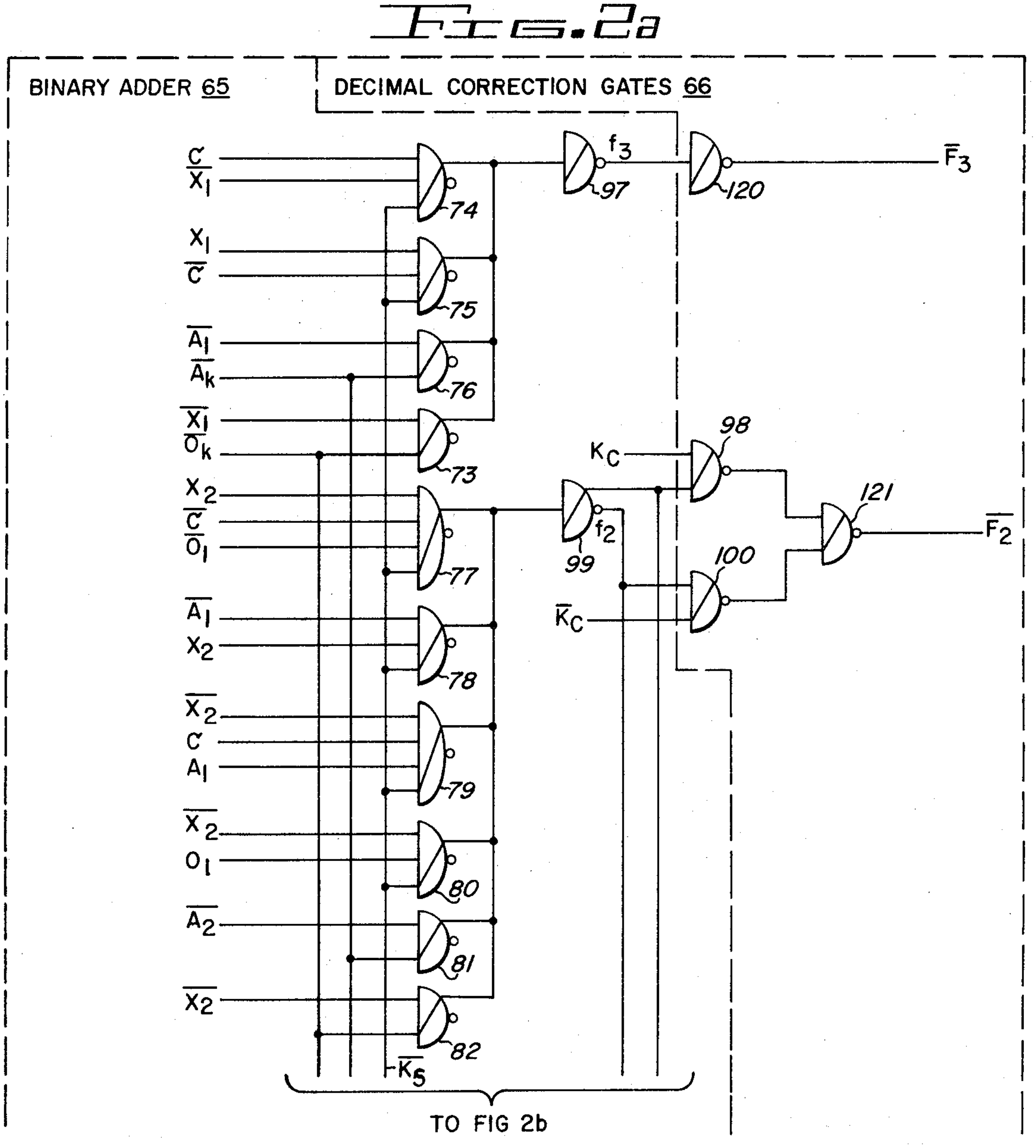
Figure 2B:
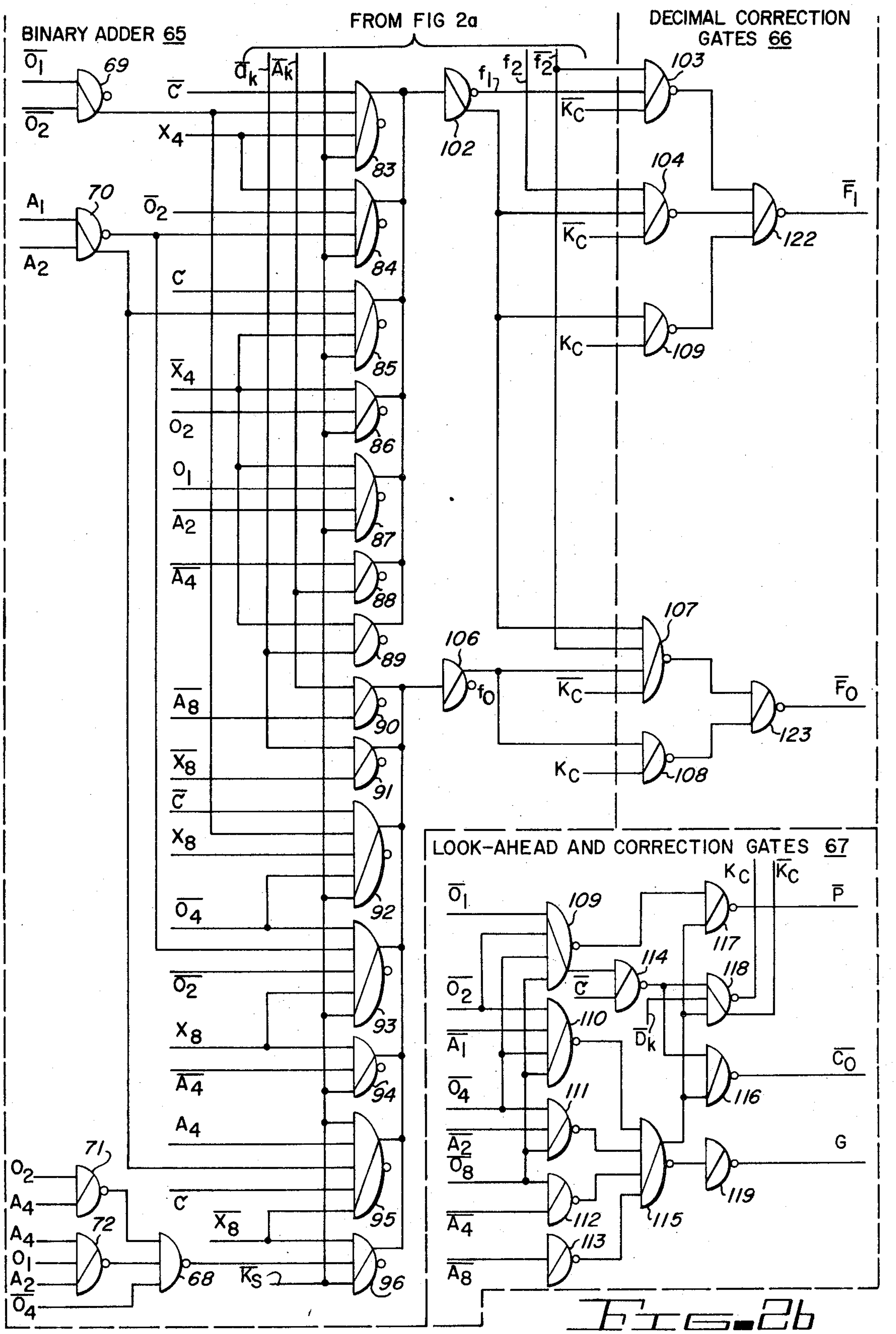

The function generator module illustrated in FIGS. 1, 2A and 2B receives a first input operand bit quartet, $\bar{C}_0$, $\bar{C}_1$, $\bar{C}_2$, $\bar{C}_3$, where the respective bits represent binary numbers, binary coded decimal, or a set of logical bits, in bit complemented form. A second input operand bit quartet, $\bar{B}_0$, $\bar{B}_1$, $\bar{B}_2$, $\bar{B}_3$, corresponding to the second operand, a set of function control signals, $K_d$, $K_+$, $K_\wedge$, $K_v$, and a carry-in signal, $c_i$, are also received by the module. These four sets of signals are regenerated by NOR gates 10–13, 20–23, 5–8, and 9 respectively, and complemented in the process. These gates, as the gates used generally in the function generator, have the logical relationships shown in FIG. 3. A first output is the inverted logical OR, i.e., NOR, of the input signals $\overline{AVB}$, and a second output signal, i.e., OR, AvB is also available, as shown, which is the complement of the first output signal.

A set of first operand gates 2 generates the true value of the input bits $C_{0-3}$ on the respective NOR outputs $A_{0-3}$, unless the control signals for both decimal and add are one. That is, when $K_d = K_+ = 1$ and NOR gate 16 produces a 1, $\overline{K_d \vee K_+} = K_d \wedge K_+$, in which case, gates 2 generate an excess-6 coded form of the input operand C. The OR output $a_0$ of gate 30 is derived from gates 10, 33 and 34, yielding:

$$a_0\ 32\ \bar{C}_0 \vee \overline{\bar{C}_1 \vee \overline{K_d K_+}} \vee \overline{\bar{C}_2 \vee \overline{K_d K_+}} = C_0 \vee (C_1 \vee C_2) K_d K_+.$$

The OR output $a_1$ of gate 31 is derived from gates 35–37, yielding:

$$a_1 = \overline{\bar{C}_1 \vee \bar{C}_2 \vee \overline{K_d K_+}} \vee \overline{\bar{C}_1 \vee K_d K_+} \vee \overline{C_1 \vee C_2 \vee \bar{K}_d \bar{K}_+} = (\overline{C_1 \oplus C_2}) \wedge K_d K_+ \vee C_1 \overline{K_d K_+}$$

The OR output of $a_2$ of gate 32 is derived from gates 38 and 39, yielding:

$$a_2 = \overline{\bar{C}_2 \vee \overline{K_d K_+}} \vee \overline{C_2 \vee \overline{K_d K_+}} = C_2 \oplus K_d K_+$$

The least significant bit $a_3$, is unchanged by the excess-6 code, and is therefore directly available from the NOR output of gate 13. The NOR outputs of gates 30–32 and the OR output of gate 12, provide the first operand output gates 2 outputs $a_{0-3}$ The second operand output gates 3 generate the true value of input bits $B_{0-3}$ or their complement in accordance with add control signal $K_+$. For example, the OR output of gate 24, $b_0$, is derived from gates 41 and 42, yielding:

$$\overline{\bar{K}_+ \vee \bar{B}_0} \vee \overline{K_+ \vee B_0} = \overline{K_+ \oplus B_0}$$

Accordingly, the NOR output $\bar{b}_0$ of gate 24 is $K_+ \oplus b_0$.

Gates 25–27 operate in the same manner as gate 24, being connected to pairs of gates 43–44, 45–46 and 47–48, respectively. These yield OR outputs $b_i = \overline{K_+ \oplus \bar{B}_i}$.

The outputs of operand gate sets 2 and 3 are combined in the set of logical gates 4 to generate the elementary logical functions AND, OR, and exclusive OR for the respective bit pairs $a_i$ and $b_i$. For the least significant bit pair $a_3$ and $b_3$, the gate 58 generates an OR output $a_3 \vee b_3$ hence:

$$0_1 = a_3 \vee b_3 \text{ and } \bar{0}_1 = \bar{a}_3 \bar{b}_3$$

Similarly, gate 57 generates $\bar{A}_1 = \bar{a}_3 \vee \bar{b}_3 = \overline{a_3 b_3}$, and $A_1 = a_3 b_3$ Gate 63 generates an OR output, $\bar{X}_1 = A_1 \vee \bar{0}_1$, hence:

$$\bar{X}_1 = a_3 b_3 \vee \bar{a}_3 \bar{b}_3 = \overline{a_3 \oplus b_3}, \text{ and}$$

$$X_1 = a_3 \oplus b_3$$

Gates 51–56 and 60–62 generate elementary logical functions for the more significant bit pairs in the same manner as for the least significant bit pair. The elementary functions all take the following forms:

| | |
|---|---|
| $0_i = a_j \vee b_j$ | $\bar{0}_i = \bar{a}_j \bar{b}_j$ |
| $A_i = a_j b_j$ | $\bar{A}_i = \overline{a_j b_j}$ |
| $X_i = a_j \oplus b_j$ | $\bar{X}_i = \overline{a_j \oplus b_j}$ |

For $i = 1, 2, 4$ and $8$, $j = 3, 2, 1$ and $0$, respectively.

In order to provide function selection, and to introduce the carry-in into the adder function generation, additional logic is provided in FIG. 1. The OR output of gate 19 generates $\bar{K}_S = K_\wedge \vee K_v$, which indicates that a logical function is called for, hence its complement specifies an arithmetic function. A single gate is shown for generating this signal, but even though NOR gates generally have very high fan-out capability, it is normally desirable to distribute the $K_S$ load by replicating gate 19. The inputs to gate 19 are the NOR outputs of gates 7 and 8. The OR outputs of gates 7 & 8 provide control signals $\bar{A}_K$ and $\bar{O}_K$, which call for the AND function or the exclusive OR functions, respectively. The NOR and OR outputs of gate 9 provide the carry-in signals in true and complemented forms, $c$ and $\bar{c}$, respectively.

In FIGS. 2a and 2b, the binary adder 65, in response to outputs from logical gates 4 and the control signals from FIG. 1, serves to generate the logical functions in addition to the arithmetic functions. The desired outputs signals $F_{0\text{-}3}$ are provided by gates 106, 102, 99 and 97, respectively, which are not NOR gates, but are collector gates. For example the output $F_3$ of gate 97 is the following:

$$f_3 = \bar{c}\,\bar{\bar{X}}_1 K_S \vee \bar{\bar{c}}\,\bar{X}_1 K_S \vee \bar{\bar{A}}_1 \bar{\bar{A}}_k \vee \bar{\bar{X}}_1 \bar{\bar{0}}_k$$
$$= (c \oplus X_1) K_S \vee A_1 A_k \vee X_1 O_k$$
$$= (c \oplus (a_3 \oplus b_3))(\bar{K}_\wedge \bar{K}_v) \vee a_3 b_3 K_\wedge \vee (a_3 \oplus b_3) K_v$$

This is conveniently implemented by connecting the OR outputs of gates 73–76 together as a single input to NOR gate 97. That is, gates 73–76 which provide the inputs to gate 97, and gate 97, result in a two-level logic arrangement analogous to the conventional function generator using an OR gate to collect a logical sum of products. However, the outputs $f_{0\text{-}3}$ are the sum of products of complemented variables.

Similarly, gate 99, from its input gates 77–82, generates the output $f_2$ as follows:

$$f_2 = c O_1 \bar{X}_2 K_S \vee A_1 \bar{X}_2 K_S \vee \bar{c}\,\bar{A}_1 X_2 K_S \vee \bar{O}_1 X_2 K_S \vee A_2 A_k \vee X_2 O_k$$
$$= [c(a_3 \vee b_3)(\overline{a_2 \oplus b_2}) \vee a_3 b_3 (\overline{a_2 \oplus b_2}) \vee \bar{c}\,\overline{a_3 b_3}(a_2 \oplus b_2) \vee \bar{a}_3 \bar{b}_3 (a_2 \oplus b_2)](\bar{K}_\wedge \bar{K}_v) \vee a_3 b_3 K_\wedge \vee (a_3 \oplus b_3) K_v$$

In the same manner, gate 102, from its input gates 83–89 generates the output $f_1$, as follows:

$$f_1 = c\, O_1 0_2 \bar{X}_4 K_S \vee 0_2 (A_1 \vee A_2) \bar{X}_4 K_S \vee \bar{c}\,\bar{A}_1 \bar{A}_2 X_4 K_S \vee \bar{O}_2 X_4 K_S \vee \bar{0}_1 \bar{A}_2 X_4 K_S \vee A_4 A_k \vee X_4 0_k$$
$$= [c(a_3 \vee b_3)(a_2 \vee b_2)(\overline{a_1 \oplus b_1}) \vee \bar{c}\,\overline{a_3 b_3}\,\overline{a_2 b_2}(a_1 \oplus b_1) \vee (a_3 b_3 (a_2 \vee b_2) \vee a_2 b_2)(\overline{a_1 \oplus b_1}) \vee \bar{a}_2 \bar{b}_2 (a_1 \oplus b_1) \vee \bar{a}_3 \bar{b}_3 \overline{a_2 b_2}(a_1 \oplus b_1)](\bar{K}_\wedge \bar{K}_v) \vee a_1 b_1 K_\wedge \vee (a_1 \oplus b_1) K_v$$

Also, gate 106, from its input gates 90–96 generates the output $f_0$ as follows:

$$f_0 = c 0_1 0_2 0_4 \bar{X}_8 K_S \vee (A_1 \vee A_2) 0_2 0_4 \bar{X}_8 K_S \vee A_4 \bar{X}_8 K_S \vee \bar{c}\,\bar{A}_1 \bar{A}_2 \bar{A}_4 X_8 K_S \vee (\bar{0}_4 \vee \bar{0}_1 \bar{A}_2 \bar{A}_4 \vee \bar{0}_2 \bar{A}_4) X_8 K_S \vee A_8 A_k \vee X_8 0_K$$
$$= [[c(a_3 \vee b_3)(a_2 \vee b_2)(a_1 \vee b_1) \vee (a_3 b_3 (a_2 \vee b_2) \vee a_2 b_2) \wedge (a_1 \vee b_1) \vee a_1 b_1](\overline{a_0 \oplus b_0}) \vee [\bar{c}\,\overline{a_3 b_3}\,\overline{a_2 b_2}\,\overline{a_1 b_1}(a_0 \oplus b_0) \vee (\bar{a}_1 \bar{b}_1 \vee \overline{a_3 b_3}\,\overline{a_2 b_2}\,\overline{a_1 b_1} \vee \bar{a}_2 \bar{b}_2 \overline{a_1 b_1})](a_0 \oplus b_0)](\bar{K}_\wedge \bar{K}_v) \vee a_0 b_0 K_\wedge \vee (a_0 \oplus b_0) K_v$$

In order to reduce the fan-in to gates such as gates 93 and 95, gates 68–72 form intermediate partial logic function in accordance with the above equations.

The FIG. 2 carry look-ahead and correction gate set 67, provides a carry-out signal $\bar{c}_o$ from the NOR output of gate 116, in complemented form. The carry-out is generated from the input gates 109–115 as follows:

$$\bar{c}_o = \overline{c 0_1 0_2 0_4 0_8 \vee A_1 0_2 0_4 0_8 \vee A_2 0_4 0_8 \vee A_4 0_8 \vee A_8}$$

Similarly, a pair of output signals, $\bar{P}$ and G, are provided to support carry look-ahead gate sets for several units of the type disclosed. The output G from gate 119 indicates that there is a carry to the next more significant bit quartet, even if there is no carry-in from the next less significant bit quartet. This output is accordingly:

$$G = A_1 0_2 0_4 0_8 \vee A_2 0_4 0_8 \vee A_4 0_8 \vee A_8$$

The output $\bar{P}$ from gate 117 indicates that a carry from the next less significant bit quartet should be propagated, because the sum of $a_{0\text{-}3}$ and $b_{0\text{-}3}$ is at least 15. Accordingly, the output of gate 117 is:

$$\bar{P} = \overline{0_1 0_2 0_4 0_8 \vee A_1 0_2 0_4 0_8 \vee A_2 0_4 0_8 \vee A_4 0_8 \vee A_8}$$

For decimal operations, the output of the binary adder 65 must be corrected, if the sum lies within the range 0–9, inclusive, for addition, or for subtraction, if the minuend is less than the subtrahend. In both cases, the conditions are equivalent $\bar{c}_o = 1$. Therefore, gate 118 OR output provides the desired control signal.

$$K_c = \overline{\bar{D} \vee C 1 0_2 0_4 0_8 \vee A_2 0_4 0_8 \vee A_2 0_4 0_8 \vee A_4 0_8 \vee A_8}$$

The OR output of gate 118 is a 0, if correction is required.

$$\bar{K}_c = c_0 \vee \bar{D}$$

The FIG. 2 decimal correction gate set 66 adds 10, modulo 16, to the adder when $K_c = 1$. Gate 121, from gates 98–100 generates:

$$\bar{F}_2 = \overline{f_2 \bar{K}_c \vee \bar{f}_2 K_c} = \overline{f_2 \oplus K_c}$$

Gate 121 generates $\bar{F}_1$ from gates 102–105:

$$\bar{F}_1 = \overline{\bar{f}_1 f_2 K_c \vee f_1 \bar{f}_2 K_c \vee f_2 \bar{K}_c} = \overline{(f_1 \oplus f_2) K_c \vee f_2 \bar{K}_c}$$

Gate 123 generates $\bar{F}_0$ from gates 106–108:

$$\bar{F}_0 = \overline{f_0 f_1 f_2 K_c \vee f_0 \bar{K}_c}$$

The least significant bit is unaffected by decimal corrections so that its output is the complemented form of $f_3$, available from the NOR output of gate 120, hence:

$$\bar{F}_3 = \bar{f}_3.$$

The output functions of the function generators are in accordance with the following table:

Function Generator Truth Table

| $C_i$ | $K_\wedge$ | $K_v$ | $K_d$ | $K_+$ | Function |
|---|---|---|---|---|---|
| 1 | 0 | 0 | 0 | 0 | C + $\bar{B}$ binary subtraction |
| 0 | 0 | 0 | 0 | 1 | C + B binary addition |
| 1 | 0 | 0 | 1 | 0 | C + $\bar{B}$ decimal subtraction |
| 0 | 0 | 0 | 1 | 1 | C + B decimal addition |
| – | 0 | 1 | 0 | 0 | C⊕$\bar{B}$ logical equivalence |
| – | 0 | 1 | 0 | 1 | C⊕B exclusive OR |
| – | 0 | 1 | 1 | 0 | – (not assigned) |
| – | 0 | 1 | 1 | 1 | – (not assigned) |
| – | 1 | 0 | 0 | 0 | C∧$\bar{B}$ AND (with complemented operand) |
| – | 1 | 0 | 0 | 1 | C∧B AND |
| – | 1 | 0 | 1 | 0 | – (not assigned) |
| – | 1 | 0 | 1 | 1 | – (not assigned) |
| – | 1 | 1 | 0 | 0 | C V $\bar{B}$ OR (with complemented operand) |
| – | 1 | 1 | 0 | 1 | C V B OR |
| – | 1 | 1 | 1 | 0 | – (not assigned) |
| – | 1 | 1 | 1 | 1 | – (not assigned) |

For logical functions, either or both of the input control signals $K_\wedge$ and $K_v$ have the logical value of one. For $K_\wedge$ being one, the outputs $\bar{F}_{0\text{-}3}$ of the function generator are the four logical AND products, $\bar{C}_j \wedge \bar{B}_j$; for $K_v$ being one, the outputs are the logical exclusive OR, $\bar{C}_j \oplus \bar{\bar{B}}_j$; and for $K_\wedge$ and $K_v$ both being one, the combined outputs are the inclusive OR, $\bar{C}_j \vee \bar{B}_j$, where $j = 0–3$ (assuming $K_d$ being zero and $K_+$ being one). With the control signal $K_+$ being zero, the second operand bits $\bar{B}_j$ are complemented, resulting in a doubling of the logical functions of bit pairs. For example, for $K_d$, $K_+$ and $K_\wedge$ being zero and $K_v$ being one, the equivalence function, $\bar{C}_j \equiv \bar{B}_j$ is generated. As a result, the function generator is effectively universal. Although sixteen functions of bit pairs are possible, the majority are trivial or redundant. Two of the functions are the constants zero and one, and these functions are of no practical value. Four of the functions are merely regenerations of one bit or its complement. Two functions not implemented are NAND and NOR, but these functions are essentially redundant because they are merely the complements of the AND and OR functions.

When both $K_\wedge$ and $K_v$ are zero, an arithmetic function is specified. When $K_d$ and $K_+$ are one, the first operand gates 2 convert the 8–4–2–1 code to excess-6 code by adding six to the operand. For decimal subtraction, with $K_+$ a zero, the second operand gates complement that operand's bits, thereby producing an excess-6 conversion of the 9's complement of the operand. The logical gates 4 generate at the first level the AND, NAND, OR and NOR functions for pairs of bits from corresponding bit positions of the input operands. Either the NAND or NOR outputs alone are sufficient for the generation of any desired function, hence the first level constitutes a complete set of elementary logical functions. However, the provision of a second level of gates 60–63, which provide the exclusive OR function and its complement, significantly simplifies the binary adder. Similarly for subtraction, with a carry-in applied to the least significant module, the sign of the result is handled automatically. If the result is positive, the carry-out from the most significant module is a one, so that the assumed sign of the result is correct. If the result is negative, the 10's complement is generated and the carry-out is a zero In response to the zero carry-out, the result can be complemented and the sign changed or the carry-out saved as an indicator. For a series of computations the result can be treated as a 10's complement number, with the indicator serving as a sign bit, analogous to processing 2's complement binary numbers.

The resulting module performs binary arithmetic with no significant degradation of speed. In fact, the provision of carry look-ahead logic supports very high speed execution of arithmetic operations. Furthermore, not only is decimal arithmetic implemented but it is implemented in a manner whereby the very high speed characteristic of carry look-ahead logic is supported for decimal operations. When either the sign character is used as a 10's complement sign representation (as opposed to sign and magnitude representation) or an indicator is used to store the sign of a result, series of arithmetic operations can be performed with a speed comparable to the execution of 2's complement arithmetic.

While a preferred embodiment of the invention has been shown and described, it is not intended that the invention be limited to such disclosure. For example, the invention can be implemented with NAND gates, or any other set of logical gates which provide a complete set of binary functions. Also, the module can be adapted to accept and generate signals in true form as opposed to the bit complemented form. One approach is to invert the system logic so that the carry-in signal is complemented and the logical function selection is changed, e.g., for $K_v = 1$, the NAND function is generated. Accordingly, the preferred embodiment supports systems processing data in either true or bit complemented form.

What is claimed is:

1. A function generator module comprising:

A. a set of conversion gates, responsive to a first input quartet operand, for selectively adding the value six to said first operand;

B. a set of elementary logical gates, responsive to the outputs of said set of conversion gates and a second input quartet of bits, for generating sets of functions, for respective bit pairs, each set of functions providing a complete logic set;

C. logical gate means, responsive to the outputs of said set of elementary logical gates and a carry-in signal, for selectively generating the binary sum bits of the input operands and the carry-in or a selected logical function;

D. a set of decimal correction gates, connected to said logical gate means for selectively adding ten modulo sixteen to said sum bits;

E. a set of carry look-ahead gates, connected to said set of elementary logical gates, for generating a carry-out for said module;

F. logic control means, responsive to input function selection signals, for selecting the desired logical gate means output, and for enabling said set of decimal correction gates for decimal arithmetic.

2. The function generator of claim 1 further comprising:

G. logic in said set of carry look-ahead gates for generating carry propagate and generate signals for the function generator.

3. The function generator of claim 2 further comprising:

H. a set of complement gates, responsive to said second input quartet of bits and said logic control means for selectively complementing said second input.

4. A function generator for performing signed binary and decimal arithmetic operations, together with basic logical operations on a pair of bit quartet operands comprising:

A. conversion operand gating means, responsive to a first input bit quartet operand, for selectively generating four bit signals representing either the excess-6 coded representation or the true representation of a first input operand;

B. first input control means responsive to input control signals representing binary/decimal and add/subtract functions and connected to said first operand gating means for selecting the excess-6 coded representation if and only if a decimal add operation is specified by the input control signals;

C. complement operand gating means, responsive to a second input bit quartet operand, for selectively generating four bit signals representing either the second operand or its 1's complement in accordance with input control signals specifying an add or subtract operation;

D. logical gating means responsive to the outputs of said conversion and complement operand gating means for generating four sets of signals, each set being derived from a pair of input signals, one each from said respective operand gating means, said set including the inclusive OR and AND functions of each of said pair of input signals;

E. carry gating means responsive to the outputs of said logical gating means for generating a carry-out signal;

F. adder means responsive to the outputs of said logical gating means and a carry-in to the function generator for selectively generating the binary sum of or a logical function of the outputs of said first and second operand gating means, in accordance with the input control signals;

G. decimal correction means connected to said adder means for correcting the adder output in response to said carry-out signal representing no carry.

5. The function generator of claim 4 further comprising:

H. first level logic in said logical gating means for generating the AND and OR functions of respective bit pairs of said input operands;

I. logic in said carry gating means, responsive to the outputs of said first level logic, for generating carry propagate and generate signals for the function generator.

* * * * *